Oct. 7, 1958  G. ROBINSON ET AL  2,854,885
COMPOSITE ELECTRONIC AND FILM CAMERA
Filed Feb. 28, 1955  8 Sheets-Sheet 1

INVENTORS
GLEN ROBINSON,
GEORGE M. LAMAN,
BY
ATTORNEY

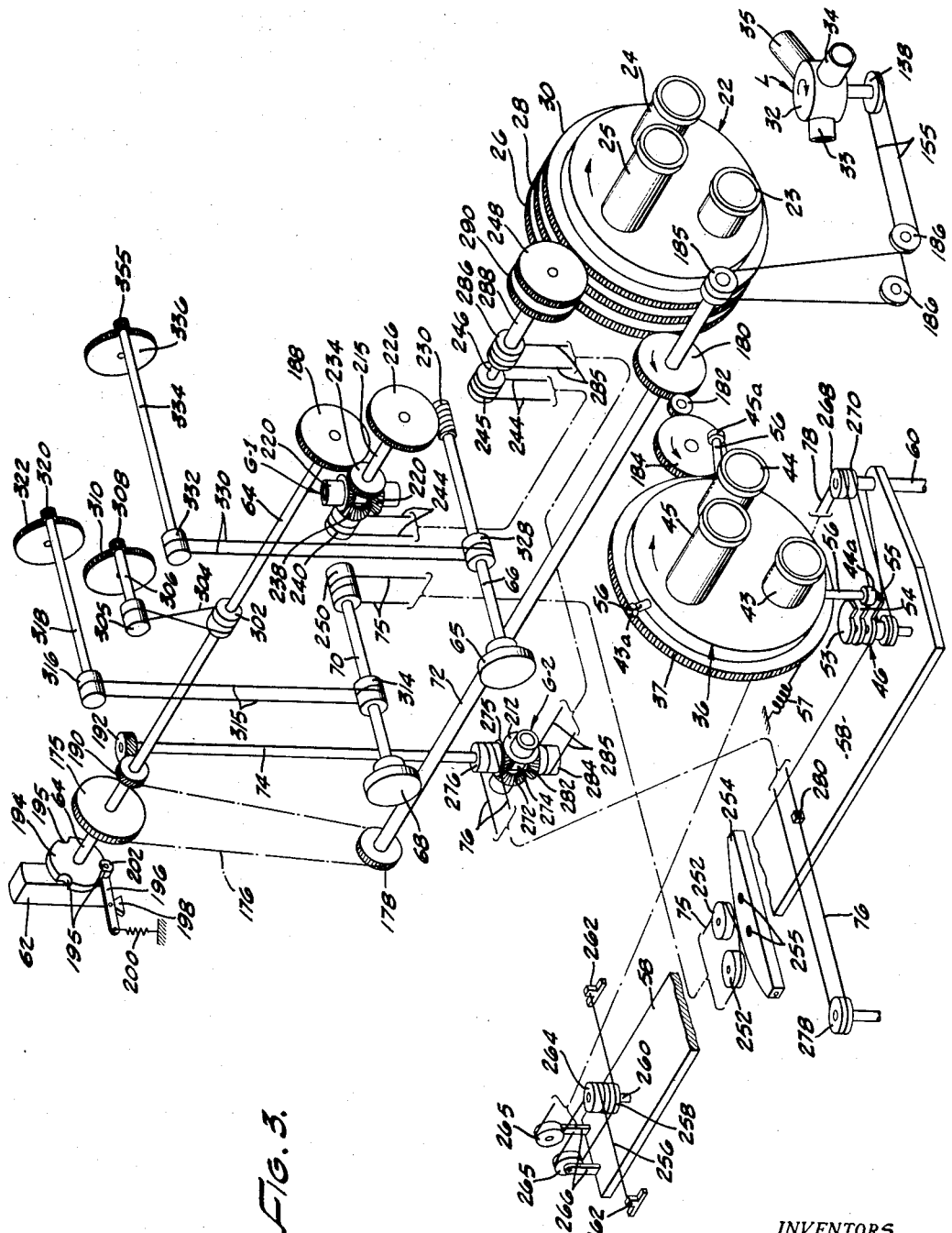

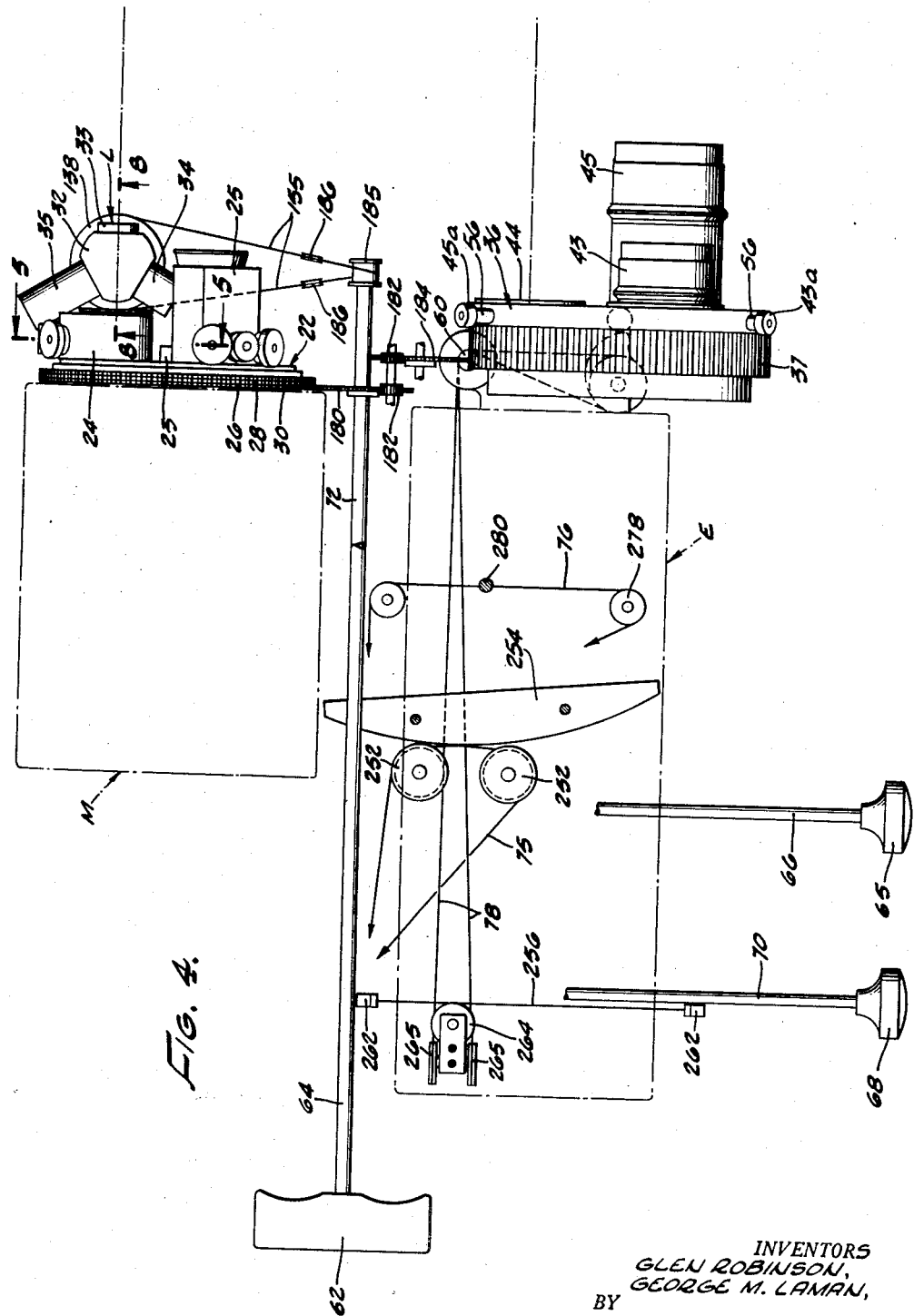

Oct. 7, 1958 G. ROBINSON ET AL 2,854,885
COMPOSITE ELECTRONIC AND FILM CAMERA
Filed Feb. 28, 1955 8 Sheets-Sheet 4
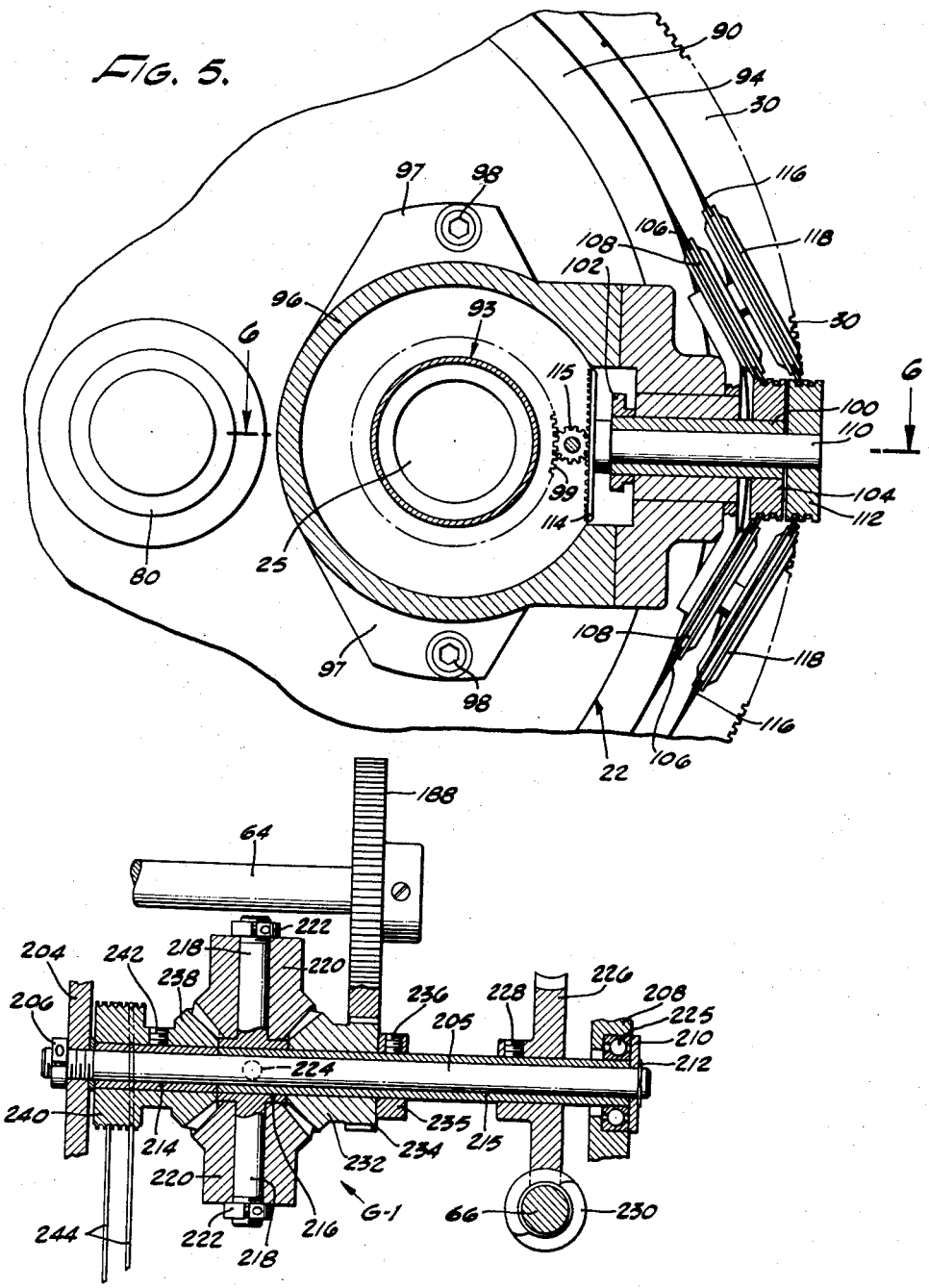
INVENTORS
GLEN ROBINSON,
GEORGE M. LAMAN,
BY
ATTORNEY

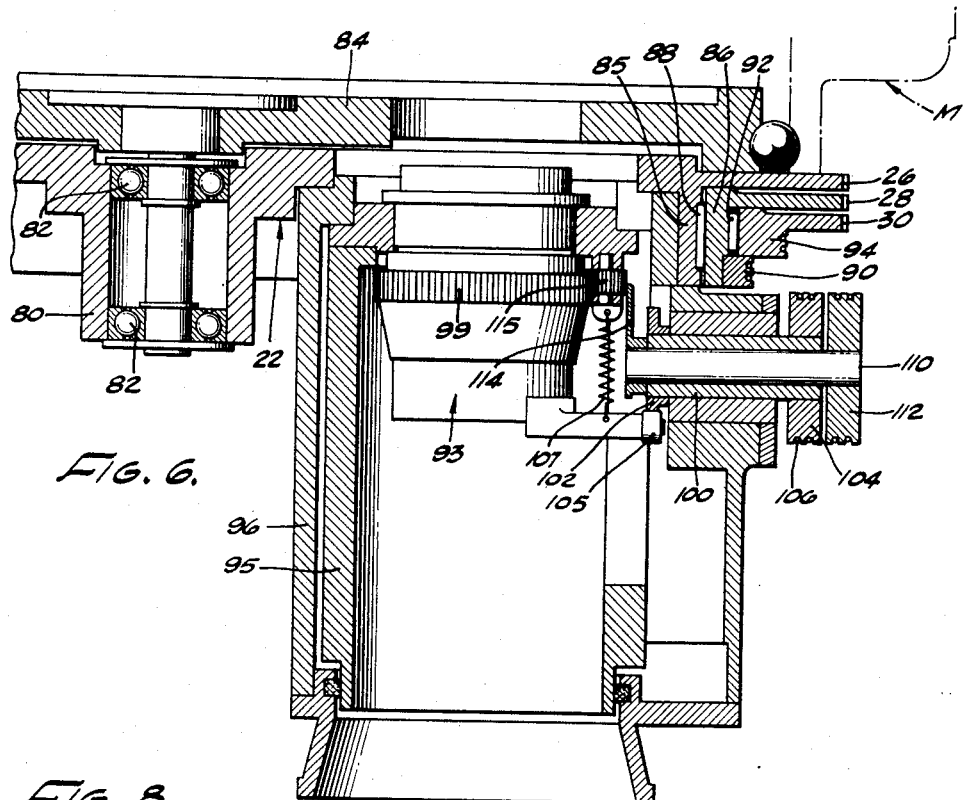
FIG. 6.
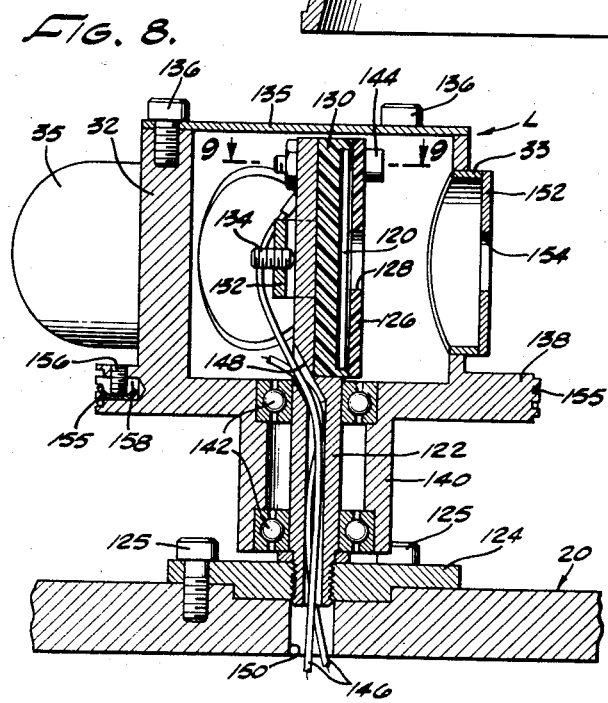
FIG. 8.
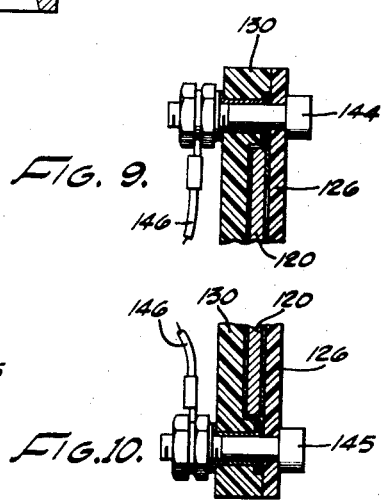
FIG. 9.
FIG. 10.
INVENTORS
GLEN ROBINSON,
GEORGE M. LAMAN,
BY
ATTORNEY Oct. 7, 1958
G. ROBINSON ET AL
2,854,885
COMPOSITE ELECTRONIC AND FILM CAMERA
Filed Feb. 28, 1955
8 Sheets-Sheet 6
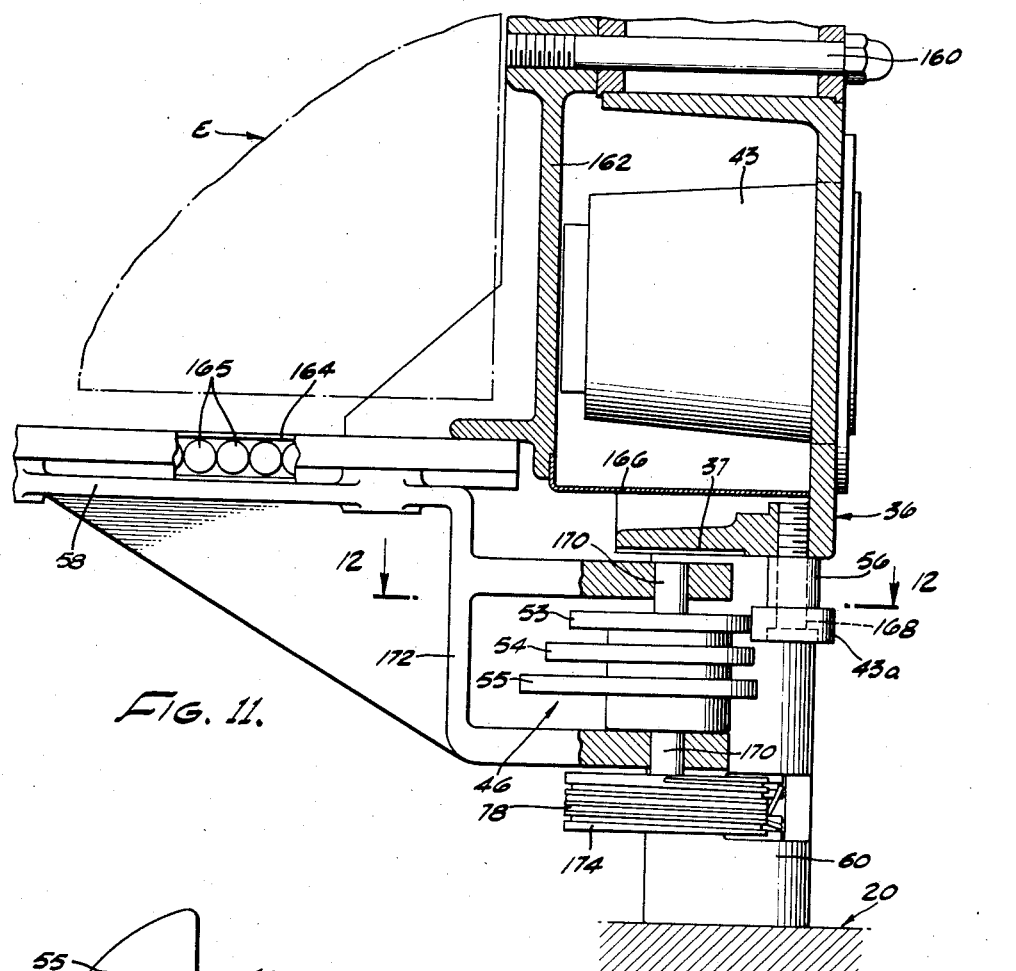
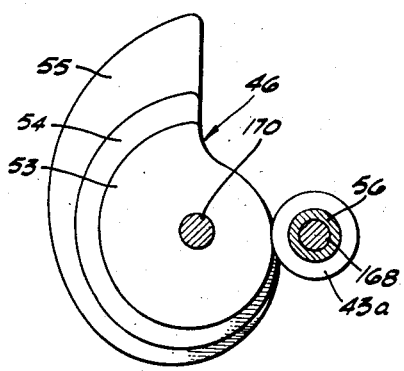
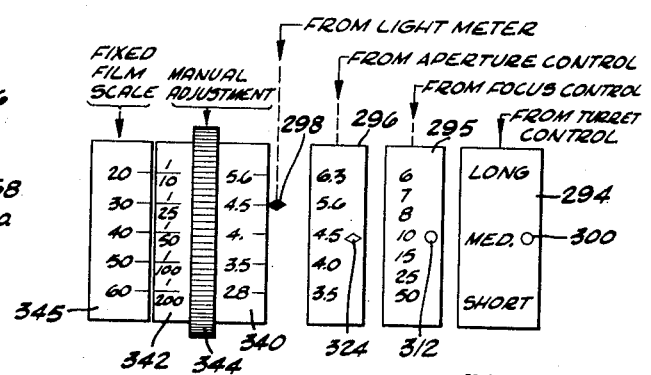
INVENTORS
GLEN ROBINSON,
GEORGE M. LAMAN,
BY
ATTORNEY

INVENTORS
GLEN ROBINSON,
GEORGE M. LAMAN,
BY
ATTORNEY

Oct. 7, 1958 G. ROBINSON ET AL 2,854,885
COMPOSITE ELECTRONIC AND FILM CAMERA
Filed Feb. 28, 1955 8 Sheets-Sheet 8

INVENTORS
GLEN ROBINSON,
GEORGE M. LAMAN,
BY
ATTORNEY

United States Patent Office 2,854,885
Patented Oct. 7, 1958

2,854,885

COMPOSITE ELECTRONIC AND FILM CAMERA

Glen Robinson, Pasadena, and George M. Laman, Hollywood, Calif., assignors to Camera Vision Productions, Inc., Beverly Hills, Calif., a corporation of Nevada Application February 28, 1955, Serial No. 490,882

34 Claims. (Cl. 88—16)

This invention relates to a combination of motion picture camera, an electronic camera and at least one corresponding electronic viewer, which combination may be used either primarily to produce motion picture films or primarily to produce television performances or to carry out both of these purposes simultaneously.

With both the motion picture camera and the television camera creating images of the same subject, the electronic viewer may serve not only as the camera viewer for the purpose of the camera man but as means remote from the two cameras for monitoring use by a director and his technical assistants. Thus when the primary purpose is to produce a motion picture film the apparatus serves as a highly effective production tool for saving time, cutting costs in various ways and for reducing the amount of discarded footage.

A feature of the invention is that two or three such camera combinations or composite units may be utilized to photograph the same action simultaneously from different viewpoints and/or at different distances. A plurality of the camera units may also be functionally coordinated with a corresponding plurality of projectors to reduce to a minimum the time and effort required for editing and cutting motion picture film.

When such an apparatus is used primarily for the sake of the electronic image as in the production of a live television show, the motion picture camera makes it possible to produce simultaneously a motion picture film of much higher quality than can be produced by the usual kinescope procedure. In fact the apparatus makes it possible to produce a motion picture film of such high quality that the motion picture film may be used for first class entertainment in motion picture theaters and also may be used for subsequent television reproductions of the same performance.

The broad object of the invention is to correlate a motion picture camera with a television camera in such manner as to provide a unit that is highly flexible and versatile and that may be adapted with high rapidity to the changing requirements of a continuous performance. It is further contemplated that such a unit will incorporate certain automatic features and safeguards to insure sustained quality on the part of the product and also to minimize the possibility of breaks in continuity of imaging the action.

More specific objects of the invention and especially of the presently preferred embodiment of the invention are to meet certain problems that are encountered in the correlation of a motion picture camera, electronic camera and electronic viewer for imaging the same performance in the required flexible and versatile manner. One problem, of course, is to interlock a motion picture camera and an electronic camera to function as a unit. This problem involves correcting for parallax so that the electronic image will accurately correspond to the image produced in the motion picture camera and also involves interlocking the two cameras for synchronous focusing.

Another problem is to incorporate a light meter in the apparatus to facilitate accurate and rapid exposure adjustment of the motion picture camera. In this regard a feature of some practices of the invention is the combination of a light meter and a servo means responsive thereto for completely automatic exposure adjustment of the camera.

Another of the problems involved in the presently preferred embodiment of the invention is to provide a motion picture camera with a turret of three lenses for rapid shift from one lens to another and with all of the lenses on the turret adjustable synchronously by remote control. The turret must be rotatable from one lens position to another without disturbing the adjustment of each of the lenses and each of the lenses must be adjustable with respect to focus and aperture in synchronism with the other lenses and independently of the rotation of the turret. Thus it must be possible to adjust the focus of all of the three lenses in synchronism regardless of the rotary position of the turret and independently of the aperture or diaphragm adjustment of the lenses; it must be possible to adjust the apertures of the three lenses synchronously without regard to the rotary position of the turret and independently of the focus adjustment; and it must be possible to rotate the turret without disturbing either the synchronous focus adjustment or the synchronous aperture adjustment of the three lenses.

In the presently preferred embodiment of the invention, the electronic camera also has a turret with three lenses and the problem is to interlock such a turret with the motion picture camera turret. Thus, the electronic camera turret must operate synchronously with the motion picture camera turret and focusing of the lenses on the electronic camera turret must be correlated at all times with the focusing of the lenses on the motion picture camera turret.

A still further problem arises in that the focus adjustment of the lenses on the motion picture camera turret and the corresponding focus adjustment of the lenses on the electronic camera turret must not only be correlated with each other but also must be interlocked with parallax adjustment. Parallax adjustment may be achieved in various ways in various practices of the invention but is achieved in the presently preferred embodiment by mounting the electronic camera to one side of the motion picture camera with provision for slightly rotating the electronic camera in accord with changes in distance to the selected subject.

An important feature of the invention is the manner in which the electronic camera and viewer serve as means to check on the adjustment of the motion picture camera. One concept in this regard is to maintain the electronic camera lens with a shorter depth of field than the corresponding selected motion picture camera lens. Since in such an arrangement the focusing of the electronic lens is more critical than the focusing of the corresponding motion picture lens, sharpness of definition of the image at the electronic viewer is insurance that the interlocked motion picture camera lens is correctly focused. While a shorter depth of field for the electronic camera lens than for the motion picture lens can be obtained solely by using the electronic camera lens with a larger aperture adjustment (lower $f$ value), the preferred practice of the invention is characterized by the use of a lens of longer focal length in the electronic camera than in the motion picture camera, both lenses being mounted to produce the same image field.

A second concept in this regard is to maintain the electronic camera at a fixed aperture adjustment but to vary the amount of image-forming light admitted to the electronic camera in accord with changes in the intensity of illumination of the subject. In such an arrangement, whether or not the electronic image is sharp indicates whether or not the motion picture camera is correctly focused and at the same time the brightness of the electronic image is maintained regardless of changes in the lighting of the subject.

The above and other objects and features of the invention may be understood from the following detailed description of the presently preferred embodiment of the invention, taken with the accompanying drawings.

In the drawings, which are to be regarded as merely illustrative:

Fig. 3 is a perspective diagrammatic view of the interlocking control system for the two cameras;

Fig. 4 is a fragmentary plan view showing the turrets of the two cameras and certain portions of the control system;

Fig. 5 is a fragmentary section on an enlarged scale of the motion picture camera turret taken as indicated by the line 5—5 of Fig. 4;

Fig. 6 is a fragmentary section on the same scale taken as indicated by the line 6—6 of Fig. 5;

Fig. 7 is an enlarged sectional view of a differential gear train that is used in the control system;

Fig. 8 is an enlarged section of the light meter of the apparatus taken as indicated by the line 8—8 of Fig. 4;

Fig. 9 is a section taken as indicated by the line 9—9 of Fig. 8 showing one of the terminals of the photoelectric cell of the light meter;

Fig. 10 is a similar section showing the other terminal;

Fig. 11 is an enlarged fragmentary section of the electronic camera turret and associated mechanism taken as indicated by the line 11—11 of Fig. 1;

Fig. 12 is a section taken as indicated by the line 12—12 of Fig. 11 showing a triple cam unit or rotary cam assembly and a follower cooperating therewith for controlling the focus of the electronic camera;

Fig. 13 is a diagrammatic view showing the arrangement of adjustment-indicating means that may be mounted on the back of the unit for the guidance of the operator in the preferred practice of the invention;

General arrangement

Figure 2:
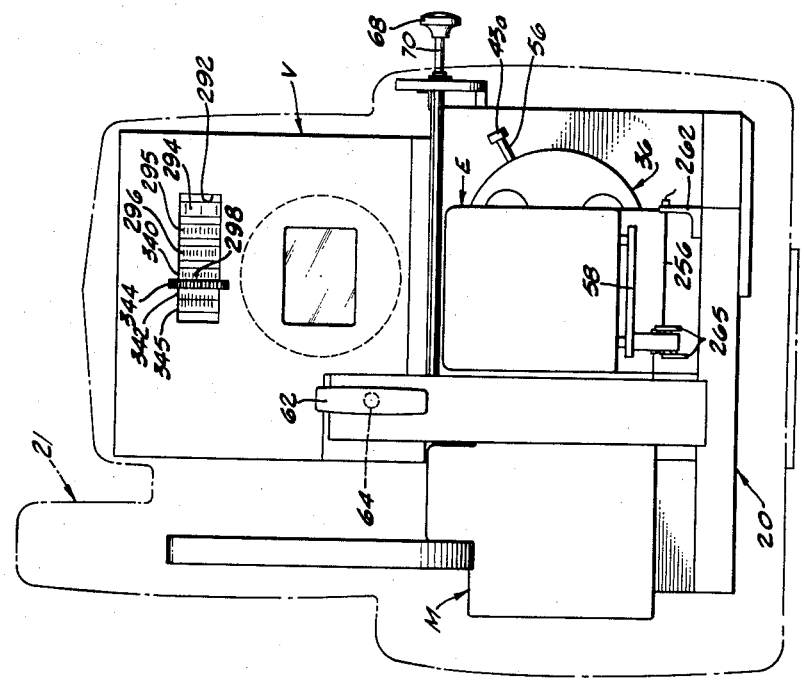
Fig. 2 is a rear elevation of the same embodiment.
Figure 1:
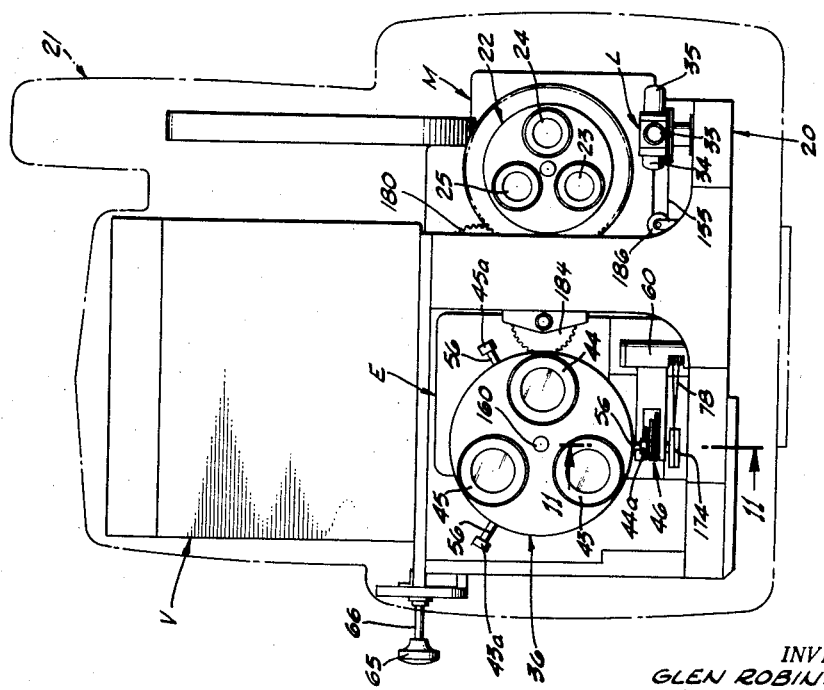
Fig. 1 is a front elevation of the selected embodiment of a unit combining a motion picture camera, an electronic camera and an electronic viewer.

Referring to Figs. 1, 2 and 4, the presently preferred embodiment of the invention includes a motion picture camera generally designated M, an electronic camera generally designated E, and a corresponding electronic viewer generally designated V, all of which are enclosed by a common shroud or "blimp" 21 shown in phantom and all of which are mounted on a common base structure 20.

The motion picture camera M is fixedly mounted on the base structure 20 and is provided with a turret 22 carrying three lenses, 23, 24 and 25 for selective use. Lens 23 may be a short focus wide-angle lens for shots at relatively long distance; lens 24 may be a medium focus lens of somewhat narrower angle for medium distance shots; and lens 25 may be a long focus lens for close-ups, such a lens being capable of achieving a close-up effect at several feet distance from the subject.

The turret 22 fixedly carries a ring gear 26 which is actuated by suitable gear means to rotate the turret from one selected position to another. Rotatably mounted on the turret 22 adjacent the ring gear 26 is a second ring gear 28 adapted to control the focus adjustments of all three of the lenses 23, 24 and 25 synchronously. Also rotatably mounted on the turret 22 is a third ring gear 30 adapted to control the aperture adjustments of the three lenses synchronously.

Mounted on the base structure 20 in front of the motion picture camera M is a light meter generally designated L having a turret 32 carrying three tubes 33, 34 and 35 corresponding respectively with the three camera lenses 23, 24 and 25. Each of these tubes serves as a light window to admit illumination from the scene to the light meter at substantially the same angle as the light admitted to the motion picture camera by the corresponding motion picture camera lens.

The electronic camera E has a turret 36 with a ring gear 37 integral therewith by means of which the turret may be rotated. This turret carries three lenses 43, 44 and 45 corresponding to the motion picture camera lenses 23, 24 and 25 respectively in angle of light admittance but of longer focal length in order to have less depth of field. All of these three lenses have the same fixed aperture or $f$ stop adjustment and in each instance the aperture is preferably larger than the maximum aperture to which the corresponding motion picture camera lens may be adjusted. The focal lengths of the three motion picture camera lenses 23, 24 and 25 may be, for example, 17½ mm., 35 mm. and 50 mm. respectively, while the focal lengths of the three electronic camera lenses 43, 44 and 45 may be 50 mm., 100 mm. and 150 mm. respectively. With such an arrangement the depth of field of each electronic lens will be much less than the depth of field of the corresponding motion picture camera lens.

Focusing of the electronic camera is accomplished by shifting the turret 36 bodily forwardly and rearwardly from the body of the electronic camera and, of course, the amount of shift for a given focal distance adjustment will differ for each of the three lenses 43, 44 and 45. The focus of the electronic camera is controlled by a rotary cam assembly 46 comprising three separate cam elements 53, 54 and 55 corresponding respectively to the three electronic lenses 43, 44 and 45. The turret 36 carries three radial arms 56 of different lengths carrying three followers 43a, 44a and 45a corresponding respectively to the three electronic lenses 43, 44 and 45.

Because of the different lengths of the radial arms 56, the cam followers 43a, 44a and 45a move in different concentric paths when the turret 36 is rotated and the three cam elements 53, 54 and 55 are at levels to intercept these three paths respectively thereby to cooperate with the cam followers. The cam elements shift the turret 36 forward against the resistance of a suitable spring 57 to the correct position for focusing whatever lens is at the effective station on the turret. In this instance the effective station on each of the two turrets 22 and 36 is the right-hand station as viewed in Figs. 1 and 3, the middle distance lenses 24 and 44 of the two cameras being shown in positions for use and the corresponding tube 34 on the light meter turret 28 being in its effective forwardly directed position.

Each of the cam elements 53, 54 and 55 is shaped, dimensioned and positioned for the same focus adjustment at each position of rotation of the cam assembly. Thus with the cam assembly 46 rotated to a position representing a distance of 8 feet from the unit to the subject, each of the cam elements will cooperate with the corresponding follower to adjust the corresponding lens to the distance of 8 feet when the turret 36 is rotated to place the corresponding lens at the effective right-hand station.

To compensate for parallax the electronic camera is mounted on a movable base 58 which, in turn, movably rests on the base structure 20 and is pivoted thereto by a suitable pivot stud 60. Thus the rear end of the electronic camera may be shifted laterally to vary the angle between the two cameras in compensation for parallax. The electronic camera may be mounted at the rear on suitable balls or rollers (not shown) to minimize the frictional resistance to such movement.

The control system for the unit as illustrated in Fig. 3 includes a differential gear train generally designated G-1 for controlling the aperture adjustment of the three lenses on the motion picture camera and includes a second differential gear train generally designated G-2 for focus control of both the set of lenses on the motion picture camera and the set of lenses on the electronic camera. A feature of the invention is the concept of directly interlocking the focus control of the two cameras with the parallax adjustment of the cameras, this concept being found to be practical because, fortuitously, the focus factor variable and the parallax factor vary in much the same manner.

The control system of the unit includes three major controls, namely, a turret-control in the form of a handle 62 on the end of an operating shaft 64, an aperture-control in the form of a knob 65 on the end of an operating shaft 66, and a focus-control in the form of a knob 68 on the end of an operating shaft 70.

The turret-control handle 62 and its operating shaft 64 are connected by means including a countershaft 72 to the ring gear 26 for rotating the motion picture camera turret 22 and to the ring gear 37 for controlling the turret 36 of the electronic camera. The countershaft 72 is additionally operatively connected with the turret 32 of the light meter L. Thus manual rotation of the turret-control handle 62 rotates the three turrets 22, 36 and 32 synchronously.

The turret-control handle 62 and its operating shaft 64 are also connected to the differential gear train G-1 to cause rotation of the aperture controlling ring gear 30 synchronously with rotation of the turret 22 so that rotation of the turret to shift from the use of one of the three lenses to another will not disturb the aperture adjustment of the three lenses. In like manner the turret-control handle 62 and its operating shaft 64 are operatively connected to the second differential gear train G-2 by means including a vertical shaft 74 to cause the focus-adjustment ring gear 28 to rotate synchronously with the turret 22 whenever the turret is rotated to change from one lens to another, thereby to prevent such change from affecting the focus adjustment of the three lenses.

The aperture-control knob 65 and its operating shaft 66 are also operatively connected to the differential gear train G-1 to rotate the aperture-adjustment ring gear 30 independently of the turret 22 whenever it is desired to change the aperture of the motion picture camera lenses.

The focus-control knob 68 and its operating shaft 70 are operatively connected to three different components of the control system. One component is the differential gear train G-2 which serves as means for rotating the focus-adjustment ring gear 28 independently of the turret 22. A second component is the rotary cam assembly 46 for controlling the focus of the electronic camera E. The third component to which the focus-control knob 68 is operatively connected is suitable means for shifting the electronic camera E about the axis of the pivot stud 60 for parallax adjustment. Thus manual operation of the focus-control knob 68 simultaneously and synchronously adjusts the focus of the two cameras and also synchronously adjusts the position of the electronic camera to compensate for parallax.

It is apparent that the focus-control knob 68 and its operating shaft 70 may be operatively connected directly with each of these three components. The present arrangement, however, takes advantage of the fact that parallax adjustment and focus adjustment vary in closely similar manner. The focus-adjustment knob is directly connected only with the means for bodily shifting the electronic camera to various angles and the body of the electronic camera is operatively connected both with the gear train G-2 for actuating the focus-adjustment ring gear 28 and with the cam assembly 46 for controlling the focus of the electronic camera. Thus in the arrangement shown the focus-control knob 68 and its operating shaft 70 move the electronic camera E pivotally by means including a cable 75; the pivotal movements of the electronic camera actuate the differential gear train G-2 by means including a cable 76; and the pivotal movements of the electronic camera also actuate the rotary cam assembly 46 by means including a cable 78.

It can be seen that the turret-control handle 62 will actuate the three turrets 22, 36 and 32 synchronously without disturbing the focus adjustments of the two cameras and that the aperture-control knob 65 may be manipulated to change the aperture adjustment of the three motion picture camera lenses regardless of the rotary position of the motion picture camera turret 22. It is further apparent that manual adjustment of the focus-control knob 68 not only focuses all six of the lenses of the two cameras but also simultaneously adjusts the relative angle between the two cameras to compensate for parallax.

*Turret construction of the motion picture camera*

As shown in Figs. 5 and 6, the turret 22 of the motion picture camera M has a hub portion 80 in which are mounted suitable ball bearings 82 by means of which the turret is rotatably mounted on a front wall 84 of the motion picture camera M. The turret 22 carries the previously mentioned ring gear 26 in a fixed manner and this ring gear has an integral cylindrical portion 85 on which a similar cylindrical portion 86 of the focus-adjustment ring gear 28 is journalled by suitable rollers 88. Fixedly mounted on the cylindrical portion 86 of the ring gear 28 is a ring member 90 having cable grooves as indicated in Fig. 6. The aperture-adjustment ring gear 30 is journalled on the cylindrical portion 86 of the ring gear 28 by another series of rollers 92. The aperture-adjustment ring gear 30 has a cylindrical portion 94 integral therewith which also is formed with cable grooves as shown in Fig. 6.

The lens mount 93 of each of the three lenses, for example the lens mount 93 of the lens 25 shown in Figs. 5 and 6, is carried by a corresponding lens carrier 95 that is slidingly mounted in a corresponding lens housing 96. As shown in Fig. 5, the lens housing 96 has ears 97 and is mounted on the front of the turret 22 by suitable screws 98. The aperture adjustment of the lens mount 93 is varied by rotation of a ring gear 99 thereon and the focus of the lens is varied by shifting the lens carrier 95 longitudinally forward or rearward.

Journalled in the side of the lens housing 96 is a radially positioned tubular shaft 100 which carries a cam 102 on its inner end and a cable drum 104 on its outer end. The cam 102 contacts a cam follower 105 of the lens carrier 95 to shift the carrier longitudinally for focus adjustment in opposition to a suitable spring 107. A suitable cable 106 (Fig. 5) is wound on the cable drum 104 and anchored thereto for actuation of the cam 102. This cable extends in opposite directions over angular guide sheaves 108 and is wound onto the grooved ring member 90 and anchored thereto. Thus rotation of the focus-adjustment gear 28 relative to the turret 22 causes corresponding rotation of the cam 102 for corresponding change in focus adjustment of the lens mount 93.

Journalled in the tubular shaft 100 is a second shaft 110 which carries a suitable cable drum 112 at its outer end and carries a suitable gear segment 114 at its inner end.

The gear segment 114 meshes with a pinion 115 which in turn meshes with the previously mentioned ring gear 99 of the lens mount 93 for adjusting the aperture of the lens. The pinion 115 remains in mesh with the ring gear 99 throughout the range of longitudinal movement of the ring gear that is incidental to focus adjustment of the lens.

A cable 116 (Fig. 5) is wound on the cable drum 112 and anchored thereto. This cable also extends in opposite directions over inclined guide sheaves 118 and is wound onto and anchored to the grooved cylindrical portion 94 of the aperture-adjustment ring gear 30. Thus rotation of the ring gear 30 relative to the turret 22 actuates the cable drum 112 by means of the cable 116 and thereby causes the gear segment 114 to make corresponding adjustment of the lens aperture.

Construction of the light meter

As best shown in Figs. 8, 9 and 10, the light meter L comprises a photoelectric cell 120 fixedly mounted on a tubular support 122 that is threaded into a suitable support plate 124. The support plate 124 is anchored by suitable screws 125 to the fixed base structure 20. The photoelectric cell is sandwiched between a forward mask 126 having a central aperture 128 and a suitable backing member 130 and this assembly is releasably secured to the tubular support 122 by means of a bracket 132 and a clamping screw 134 that adjustably extends therethrough.

The previously mentioned turret 32 of the light meter L has a suitable cover 135 normally held in place by thumb screws 136. The turret 32 has an integral cable-drum portion 138 and also has an integral tubular base portion 140 that is suitably journalled on the previously mentioned tubular support 122 by a pair of ball bearings 142.

The photoelectric cell 120 has the usual pair of terminal members 144 and 145 as best shown in Figs. 9 and 10, and two wires 146 connected to these two terminal members respectively are carried down the tubular support 122 in a manner to avoid interference with rotation of the turret 32. Thus the pair of wires 146 may extend through an inclined aperture 148 into the interior of the tubular support 122 and may extend downward through a suitable bore 150 in the base structure 20 for communication with remote indicating means or remote control means described hereafter.

Fig. 8 shows how the light-admitting tube 33, for example, restricts the angle of light admission to conform to the angle of light admission by the corresponding motion picture lens 23. In this instance the tube 33 has an outer end wall 152 with a restricting light-admitting aperture 154 therein to confine the admitted light to the required entrance angle.

The rotary position of the turret 32 is controlled by a suitable cable 155 which is wound onto the cable drum portion 138. The end of the cable 155 may be anchored to the turret by a suitable set screw 156 that extends into a radial bore 158 to clamp the cable end against the wall of the radial bore 158.

It is apparent that the light meter turret 32 restricts the angle of light admission to the photoelectric cell in accord with the selected lens on the motion picture camera M. With the light admission controlled in this way, the light meter is calibrated to indicate the aperture or f stop adjustment of the selected motion picture lens that is required for correct exposure of the film.

Construction of the electronic camera turret

As indicated in Fig. 11, the turret 36 of the electronic camera E may be rotatably mounted by a suitable horizontal spindle 160 on an upright support 162 that is unitary with a carriage 164. The carriage 164 extends under the body of the electronic camera and is movable longitudinally relative thereto on a series of supporting balls 165 carried by the movable camera base 58. As heretofore stated, the spring 57 indicated in Fig. 3 continuously urges the turret carriage 164 rearward thereby tending to maintain the carriage at a rearward limit position at which the three lenses 43, 44 and 45 are focused on infinity.

The support 162 is suitably apertured for light admission to the interior of the electronic camera from the selectively positioned lenses 43, 44 and 45. In the construction shown in Fig. 11 the previously mentioned ring gear 37 that is unitary with the turret 36 extends rearward from the turret and a fixed cylindrical housing wall 166 projects forward from the upright support 162 into the interior of the ring gear. Each of the radial arms 56 that carries one of the cam followers 43a, 44a, and 45a is mounted on the turret 36 by a corresponding axial screw 168.

The previously mentioned rotary cam assembly 46 is provided with integral vertical trunnions 170 by means of which it is journalled in a suitable bracket 172, the bracket 172 being carried by the previously mentioned movable base 58. Mounted on the lower of the two trunnions 170 is a suitable cable drum 174 to which the previously mentioned cable 78 is attached.

Fig. 3 shows the cam follower 44a on a radial arm 56 of the electronic camera turret cooperating with cam element 54 of the rotary cam assembly 46 while the corresponding electronic camera lens 44 is at the right-hand station for use to create the electronic image. Thus cam element 54 controls the axial position of the turret 36 for focusing lens 44 on the subject and rotation of the rotary assembly 46 varies this focus as desired. In like manner Fig. 11 shows cam follower 43a cooperating with cam element 53 to focus lens 43 at the right-hand turret station.

Details of the interlocking control system

The turret-control handle 62 and its operating shaft 64 drive the countershaft 72 by means of a sprocket 175 on shaft 64 that is connected by a sprocket chain 176 with a second sprocket 178 on the countershaft. The countershaft 72 carries a gear 180 that meshes with the actuating ring gear 26 of the motion picture camera turret 22 and this gear operates through two additional gears 182 and 184 to actuate the ring gear 37 of the electronic camera turret 36. The gear 184 meshes tangentially with the turret ring gear 37 on the axis of pivot stud 60 about which the electronic camera E rotates for parallax adjustment. By virtue of this arrangement gear 184 and ring gear 37 stay in mesh throughout the range of parallax adjustment.

Mounted on the end of the countershaft 72 is a cable drum 185 around which is wound a loop of the previously mentioned cable 155. The cable 155 passes around a pair of idler sheaves 186 and is wrapped around the previously mentioned cable drum portion 138 of the light meter turret 32 for actuation thereof.

The turret control shaft 64 carries a gear 188 that operates the differential gear train G–1 and also carries a worm gear 190 on the shaft 64 in mesh with a second worm gear 192 on the previously mentioned vertical shaft 74 to actuate the differential gear train G–2. Preferably suitable detent means is provided to be effective at each of the three positions of the two camera turrets at which one of the three lenses thereon is at the effective station. For this purpose the turret-control shaft 64 may carry a detent disc 194 having three peripheral detent notches 195 therein. A suitable detent lever 196 mounted on a fulcrum 198 and controlled by a suitable spring 200 carries a detent roller 202 to seat in the three notches 195 selectively. Thus the roller 202 yieldingly resists rotation of the disc 194 so that the operator can sense the rotation of the two turrets to each of their three positions.

Since both of the differential gear trains G–1 and G–2 are of substantially the same construction it will suffice to describe in detail the differential gear train G–1. As shown in section in Fig. 7, the gear train G–1 is mounted on a fixed support 204 by a spindle 205 that is threaded into the support and secured by a split nut 206. The outer end of the spindle 205 extends through a second fixed support 208 and carries a washer 210 secured thereon by a split retainer ring 212.

Rotatably mounted on the spindle 205 is a relatively short sleeve 214 and a relatively long sleeve 215. Keyed to the longer sleeve 215 is a differential gear frame or spider 216 which provides two radial spindles 218. A pair of planetary bevel gears 220 are journalled on the two spindles 218 and are retained thereon by split nuts 222. The spider 216 is anchored to the longer sleeve 215 for rotation therewith by means of a suitable set screw 224. This longer sleeve 215, which is journalled in a suitable ball bearing 225, also carries a worm gear 226 which is fixedly attached thereto by a set screw 228. The worm gear 226 meshes with a worm 230 which, as best shown in Fig. 3, is on the end of the previously mentioned control shaft 66 that is operated by the aperture-control knob 65.

Rotatably mounted on the longer sleeve 215 is a third bevel gear 232 that meshes with both of the planetary bevel gears 220 and is integral with a pinion 234. The pinion and bevel gear are held in position by a collar 235 that is retained on the sleeve 215 by a suitable set screw 236. The pinion 234 meshes with the previously mentioned gear 188 on the end of the turret-control shaft 64. Thus the bevel gear 232 and associated pinion 234 rotate independently of the longer sleeve 215 and the frame or spider 216 carrying the two planetary bevel gears 220 rotates with the worm gear 226 that is actuated by the aperture-control knob 65.

The shorter sleeve 214 that is independently rotatable on the spindle 205 carries a fourth bevel gear 238 that meshes with both of the two planetary bevel gears 220. This fourth bevel gear 238 is unitary with a cable drum 240 and the two are fixedly mounted on the rotary sleeve 214 by a suitable set screw 242. The cable drum 240 is operatively connected by a cable 244 with a cable drum 255 on a suitably journalled shaft 246. This shaft 246 carries a gear 248 that meshes with the previously mentioned ring gear 30 on the motion picture camera turret 22 for aperture adjustment of the three lenses 23, 24 and 25.

When the aperture-control knob 65 actuates the worm 230 to rotate the worm gear 226 and thereby rotate the spider 216 carrying the planetary bevel gears 220, the bevel gear 232 is held stationary by the resistance afforded by the previously described detent including the detent disc 194 and also by resistance to rotation afforded by the intermeshed worm gears 190 and 192. Consequently the two planetary bevel gears 220 travel around the fixed bevel gear 232 and in doing so cause the second bevel gear 238 to rotate in the same direction at twice the rotation of the spider 216. The cable drum 240 rotates with the bevel gear 238 and acting through the cable 244 rotates the remote cable drum 245 to cause the gear 248 to rotate the aperture-adjustment ring gear 30 on the motion picture camera turret 22. Thus the aperture-control knob 65 regulates the aperture adjustment of the three motion picture camera lenses 23, 24 and 25 independently of rotation of the turret 22.

When rotation of the turret-control shaft 64 by the turret-control handle 62 causes the gear 188 to rotate the bevel gear 232 of the planetary gear train G–1 the spider 216 remains stationary because of the irreversibility of the gear 226 in cooperation with the worm 230. With the spider 216 stationary, the rotation of the bevel gear 232 causes the two planetary bevel gears 220 to rotate on stationary axes and thereby causes the bevel gear 238 and the cable drum 240 to rotate at the same rate as the bevel gear 232 but in the opposite direction. This rotation from the cable drum 240 is transmitted to the cable drum 245 for rotation of the aperture-adjustment ring gear 30.

Thus the rotation of the turret-control handle 62 not only causes the motion picture camera turret 22 to rotate but also acting through the differential gear train G–1 causes the aperture-adjustment ring gear 30 to rotate in the same direction synchronously therewith so that the aperture adjustments of the three lenses 23, 24 and 25 are not disturbed by the rotation of the turret to shift lenses.

The focus-control shaft 70 that is actuated by the focus-control knob 68 carries a cable drum 250 that actuates the previously mentioned cable 75 for parallax adjustment of the electronic camera E. The two runs of the cable 75 pass around a pair of corresponding idler sheaves 252 that are mounted on the fixed base structure 20 under the movable base 58 of the electronic camera. The two runs of the cable 75 then cross each other as shown in Figs. 3 and 4 and are anchored at their opposite ends to a transverse member 254 that is fixedly mounted by a pair of screws 255 on the under side of the movable base 58. The transverse member 254 is grooved on its rear face to receive the cable 75 and this face is curved as indicated to receive the cable with a wrapping action. It is apparent that rotation of the focus-control shaft 70 will cause the cable 75 to swing the movable base 58 of the electronic camera E about the axis of the pivot stud 60.

For focus adjustment of the three lenses 43, 44 and 45 of the electronic camera in response to parallax-compensating pivotal movement of the electronic camera, the two ends of the previously mentioned cable 78 are wrapped in opposite directions around a cable drum 258 that is mounted on a spindle 260 carried by the movable base 58 of the electronic camera. The two opposite ends of the cable 78 are anchored to fixed lugs 262 on the fixed base structure 20. The two runs of the cable 78 pass around a pair of corresponding idler sheaves 265 that are journalled on corresponding brackets 266 carried by the movable base 58 of the electronic camera. From the idler sheaves 265 the two runs of the cable 78 extend forward to pass around two corresponding independent idler sheaves 268 and 270 that are mounted coaxially on the previously mentioned pivot stud 60 around which the electronic camera swings in compensation for parallax. Thus oscillation of the movable base 58 of the electronic camera about the axis of the pivot stud 60 causes the cable 78 to rotate the rotary cam assembly 46. In this manner the focus control knob 68 determines the focus adjustment of the electronic camera.

The second differential gear train G–2 has a pair of planetary bevel gears 272 on a spider or frame 274 that is unitary with the previously mentioned vertical shaft 74. A third bevel gear 275 in mesh with the two planetary gears 272 is unitary with a cable drum 276 around which is wrapped the previously mentioned cable 76. The cable 76 is looped around an idler sheave 278 and one of the two runs of the cable is anchored to a lug 280 on the movable base 58 of the electronic camera. By virtue of this arrangement oscillation of the electronic camera about the pivot studs 60 in compensation for parallax adjustment causes corresponding rotation of the cable drum 276 and the bevel gear 275 that it unitary therewith, the cable drum and bevel gear both being journalled on the vertical shaft 74.

Also rotatably mounted on the vertical shaft 74 for rotation independently thereof is a fourth bevel gear 282 and a cable drum 284 integral therewith, the fourth bevel gear being in mesh with the two planetary bevel gears 272. A cable 285 wound around the cable drum 284 is wrapped around a remote cable drum 286 that is keyed to a tubular shaft 288. The tubular shaft 288 is journalled on the previously mentioned shaft 246 and carries a gear 290 that meshes with the focus-adjustment ring gear 28 on the motion picture camera turret 22. Thus rotation of the bevel gear 282 of the planetary gear train G–2 actuates the cable 285 to rotate the focus-adjustment ring gear 28.

It is apparent that manual actuation of the focus-control knob 68 pivotally shifts the electronic camera E by means of the cable 75 and that such shift of the electronic camera in compensation for parallax both actuates the rotary cam assembly 46 for focus adjustment of the electronic camera and actuates the bevel gear 275 for focus adjustment of the motion picture camera. When the bevel gear 275 is rotated by the associated cable drum 276 the spider 274 on the vertical shaft 74 is held stationary by the irreversibility of the two worm gears 190 and 192. Consequently the rotation of the bevel gear 275 causes the two planetary bevel gears 272 to rotate on fixed axes and thereby causes the fourth bevel gear 282 to rotate at the same rate in the opposite direction. This rotation of the bevel gear 282 actuates the cable 285 to rotate the focus-adjustment ring gear 28. In this manner actuation of the focus-control knob 68 changes the focus of both of the two cameras synchronously and in doing so rotates the focus-adjustment ring gear 28 independently of the motion picture camera turret 22.

When actuation of the turret control shaft 64 by the turret-control handle 62 causes the vertical shaft 74 to rotate and thereby rotate the spider 274 of the differential gear train G-2, the bevel gear 275 remains stationary because of the relatively high resistance afforded by the numerous components involved in any lateral shifting action of the electronic camera. Consequently the planetary bevel gears 272 travel around the stationary bevel gear 275 and causes the fourth bevel gear 282 along with the cable drum 284 to rotate in the same direction at twice the speed of the spider. This rotation of the cable drum 284 causes the cable 285 to rotate the gear 290 for actuation of the focus-adjustment ring gear 28. Thus whenever the turret-control handle 62 is actuated to rotate the turrets of the two cameras as well as the turret of the light meter, the focus-adjustment ring gear 28 is rotated synchronously with the turret 22 to avoid disturbing the focus adjustment of the three motion picture camera lenses 23, 24 and 25.

*Means to indicate the adjustments by the control system*

In the presently described embodiment of the invention, provision is made for indicating to the operator the rotary positions of the three turrets, the focus adjustment of the two cameras and the aperture adjustment of the lenses on the motion picture camera. Preferably additional means is provided to indicate what the aperture adjustment should be on the basis of the illumination measured by the light meter L. For this purpose a back wall of the unit may be provided with a window 292 as shown in Fig. 2 in which are mounted a rotary turret indicator 294, a rotary focus indicator 295, a rotary aperture indicator 296 and a rotary light-value indicator 298 that is controlled by the light meter L. These various indicators are shown diagrammatically in Fig. 13.

The turret indicator 294 may be in the form of a plastic cylindrical ring of semi-transparent material with an index 300 mounted in fixed position inside the plastic ring. The plastic ring has the words "long," "med" and "short" inscribed thereon to register with the index 300 to indicate when the corresponding lenses of the two cameras are in position for use. As shown in Fig. 3 the means for controlling the turret indicator 294 in response to actuation of the turret-control handle 62 may include a cable drum 302 on the turret-control shaft 64. The cable drum 302 is operatively connected by a cable 304 with a second cable drum 305 on a short shaft 306. The short shaft 306 carries a pinion 308 in mesh with a gear 310 that is directly connected to the turret indicator 294 in any suitable manner.

In like manner the focus indicator 295 may be in the form of a semi-transparent cylindrical ring carrying a scale of distance values to be read with reference to a fixed index 312 inside the ring. As indicated in Fig. 3 the means for actuating the focus indicator 295 may include a cable drum 314 on the focus-control shaft 70 and this cable drum may be connected by a cable 315 with a second cable drum 316 on a countershaft 318. A pinion 320 on the end of the countershaft 318 meshes with a gear 322 that is operatively connected with the focus indicator 295 in any suitable manner.

The aperture indicator 296 may comprise a third semi-transparent ring carrying an f stop or aperture scale to be read with reference to a fixed index 324 inside the ring. As shown in Fig. 3 the aperture indicator 296 may be controlled by a cable drum 328 on the aperture-control shaft 66. This cable drum 328 is connected by a cable 330 with a cable drum 332 on a countershaft 334. A pinion 335 on the end of the countershaft 334 meshes with a gear 336 that is suitably connected with the focus indicator 295.

In the present embodiment of the invention the light-value indicator 298 is in the form of an index or marker 338 carried by a radial arm (not shown) that is journalled on the axis of an adjacent cylinder 340 to indicate values on a scale of f stop or aperture values on the cylinder 340. The rotary position of the cylinder 340 is set in accord with the speed or light-sensitivity of the film used in the motion picture camera. In the construction shown, the cylinder 340 is unitary with a second cylinder 342 and both of the cylinders are unitary with an intermediate knurled ring 344 by means of which both cylinders may be manually adjusted to various rotary positions. The second cylinder 342 carries a scale representing different speeds of shutter action or exposure periods provided by the shutter of the motion picture camera, this scale to be read with reference to a scale of film speeds on an adjacent fixed cylinder 345.

Fig. 13 by way of example shows the cylinder 342 adjusted for operation of the unit with film in the camera having an ASA speed rating of 40 and with the shutter of the motion picture camera adjusted for 1/50th second exposure. The position of the light-value indicator 298 opposite the value 4.5 on the cylinder 340 indicates that correct exposure with the prevailing illumination of the scene may be obtained with the aperture of the motion picture camera set at f 4.5. A glance at the adjacent aperture indicator 296 shows that this value 4.5 on the scale is opposite the fixed index 324. Thus the operator can ascertain at a glance whether or not the aperture adjustment of the motion picture camera is correctly set for exposure of the scene. At the same time the operator may note the position of the focus indicator 295 relative to the fixed index 312 to ascertain the focus adjustment of the lenses on the two cameras and may note the rotary position of the turret indicator 294 relative to the fixed index 300 to ascertain which of the three lenses on each of the two cameras is in use.

*A system for automatic aperture control*

Figure 14:
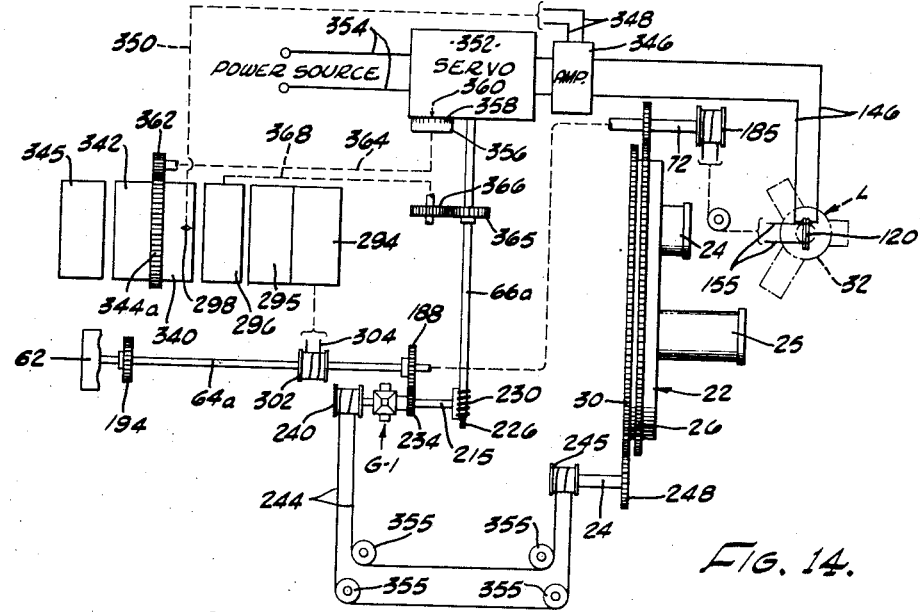
Fig. 14 is a diagrammatic view showing how a servo mechanism may be combined with a light meter for automatic control of the aperture of the motion picture camera.

Fig. 14 shows schematically how the described control system may be modified to provide automatic aperture control of the lenses on the motion picture camera in response to the photoelectric cell 120 in the light meter L. The photoelectric cell 120 is connected by the previously mentioned wires 146 to a suitable amplifier 346 which amplifier controls the previously mentioned light-value indicator 298 as indicated by the output leads 348 and the dotted line 350. The amplifier output is also connected to a suitable servo mechanism 352 that is actuated by a power source through leads 354. The servo mechanism 352 has a power shaft 66a which corresponds to and may actually be the previously mentioned aperture-control shaft 66.

As heretofore described the shaft 66a carries a worm 230 in mesh with a worm gear 226 that controls the spider carrying the planetary bevel gears of the differential gear train G-1. The differential gear train G-1 carries the previously mentioned cable drum 240 which actuates the previously mentioned cable 244. The two runs of the cable 244 are guided by various idler sheaves 355 and control the previously mentioned cable drum 245 on the previously mentioned shaft 246. The previously mentioned gear 248 on the shaft 246 is in mesh with aperture-adjustment ring gear 30 on the turret 22.

Since the action of the servomechanism 352 must take into consideration the speed of the particular film in the camera, the servomechanism has a rotary adjustment member 356 carrying a film speed scale 358 to be read with reference to a fixed index mark 360. The rotary adjustment member 356 may be adjusted manually but preferably is operatively connected to a pinion 362 as indicated by the dotted line 364, the pinion being in mesh with a gear 344a which corresponds to the previously mentioned knurled ring 344. Thus when the two unitary cylinders 340 and 342 are adjusted relative to the scale of film speeds on the fixed cylinder 345 by rotation of the gear 344a the rotary adjustment member 356 on the servomechanism is adjusted synchronously therewith. By virtue of this adjustment arrangement the control shaft 66a is shifted to various ranges of operation for response to the energization of the photoelectric cell 120 in accord with the light-sensitivity of the film in the motion picture camera.

A pinion 365 on the aperture-control shaft 66a meshes with a second pinion 366 which is operatively connected with the rotary aperture indicator 296 as indicated by the dotted line 368. Thus the operator can ascertain at a glance the particular aperture adjustment of the camera that is currently selected by the action of the servomechanism.

The focus indicator 295 is actuated by the focus control as heretofore described and the turret indicator 294 is operated in the usual manner by means including the previously mentioned cable drum 302 on a turret-control shaft 64a.

The turret-control shaft 64a is provided with the usual detent disc 194 and carries the usual gear 188 in mesh with the gear 234 associated with the planetary gear train G-1. The turret-control shaft 64a is operatively connected in the usual manner to the countershaft 72 as indicated by the dotted line 370 and this countershaft carries the usual gear 180 in mesh with the ring gear 26 that rotates the motion picture camera turret 22. The countershaft 72 also carries the usual cable drum 185 for operation of the turret 32 of the light meter L.

It is apparent that when the system shown in Fig. 14 is in operation, the servomechanism acting through the differential gear train G-1 will control the aperture-adjustment ring gear 30 of the turret 22 in accord with changing light values sensed by the photoelectric cell 120. If a change from one motion picture camera lens to another with corresponding change in the angle of light admission to the motion picture camera requires a change in aperture adjustment for correct exposure of the scene, the synchronous rotation of the light meter turret 32 will correspondingly vary the angle of light admission to the photoelectric cell 120 and the photoelectric cell acting through the amplifier 346 will cause the servomechanism 352 to actuate the control shaft 66a for corresponding aperture adjustment of the motion picture camera. The rotation of the turret 22 by the turret-control handle 62 results in synchronous rotation of the aperture-adjustment ring gear 30 by means of the differential gear train G-1 in the manner heretofore described.

*A modified system for automatic aperture adjustment*

Figure 15:
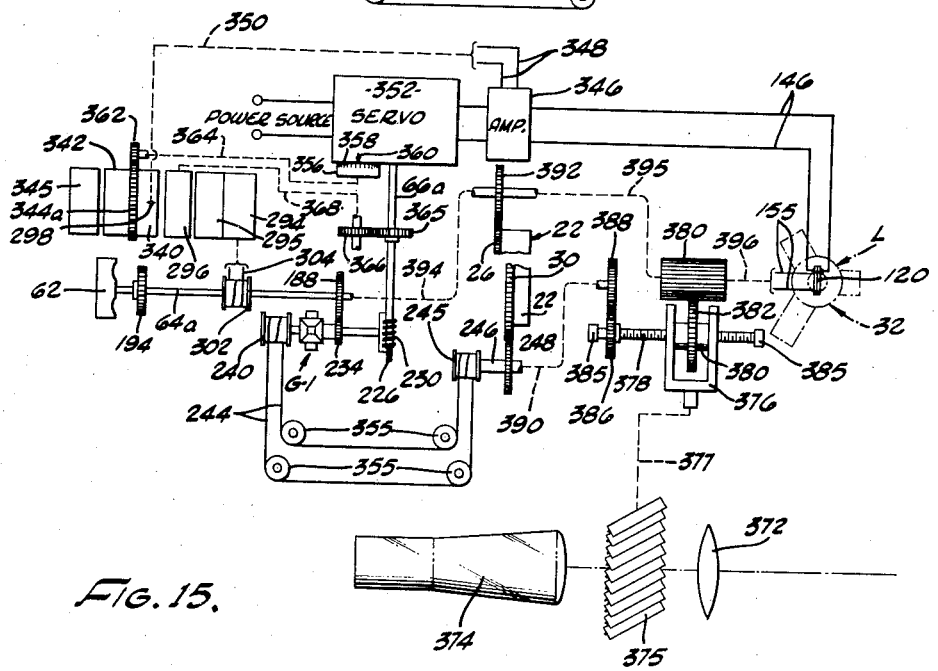
Fig. 15 is a similar diagrammatic view showing how such automatic control may include means to vary the amount of image-forming light in the electronic camera.

Fig. 15 indicates how the control system may be adapted for automatic aperture adjustment of the motion picture camera lenses with further provision for regulating the light in the electronic camera automatically to produce an adequate electronic image over a wide range of light conditions. Many of the components shown in Fig. 15 are the same as shown in Fig. 14 as indicated by the use of corresponding numerals. Thus Fig. 15 includes the various rotary indicators 294, 295, 296 and 298 together with the two cylinders 340 and 342 controlled by the ring gear 344a. The control shaft 66a that is actuated by the servomechanism 352 controls the aperture-adjustment ring gear 30 through the differential gearing G-1 in the manner heretofore described.

In this particular control system the electronic camera E which is represented by a lens 372 and the usual electronic image tube 374 and which has a fixed lens aperture is provided with means to vary the amount of image-forming light in the electronic camera in accord with the intensity of the illumination of the scene. For this purpose the electronic camera may be equipped with a set of louvers 375 to serve as a light valve between the lens 372 and the electronic image tube 374.

In the arrangement shown, the adjustment of the louvers 375 with respect to the relative amount of light passed to the tube 374 is controlled by a yoke 376 that is slidably mounted on a screw 378. The yoke 376 straddles a traveling nut 380 and is controlled by the position of the nut on the screw. The nut is provided with peripheral gear teeth 382 in mesh with a cylindrical gear 384. The screw 378 is journalled in suitable spaced bearings 385 and has keyed thereto a suitable gear 386 in mesh with a second gear 388. The second gear 388 is operatively connected with the previously mentioned gear 248 as indicated by the dotted line 390, the gear 248 being in mesh with the ring gear 30 for rotation of the turret 22. A gear 392 in mesh with the ring gear 26 for rotation of the turret 22 is operatively connected to the turret-control shaft 64a as indicated by the dotted line 394, provision being made for rotation of the gear 392 in the required direction. The gear 392 is in like manner operatively connected to the cylindrical gear 380 as indicated by the dotted line 395 and the cylindrical gear 380 is in like manner operatively connected with the light meter turret 32 as indicated by the dotted line 396.

The function of the screw 378 and the traveling nut 380 thereon is to prevent rotation of the turret-control shaft 64a from affecting the adjustment of the louvers 375 in the absence of change in aperture adjustment of the motion picture camera. When the servomotor 352 changes the aperture adjustment of the motion picture camera, the gear 388 in mesh with the gear 386 causes corresponding rotation of the screw 378 and with the cylindrical gear 380 stationary this rotation of the screw causes the traveling nut 380 to shift axially and to carry the yoke 376 with it for varying the adjustment of the set of louvers 375.

If the turret-control shaft 64a is actuated by the turret-control handle 62, the cylindrical gear 380 is rotated and the gear 378 is simultaneously rotated in the opposite direction by means of the differential gear train G-1. Thus with screw 378 rotating in one direction and the travelling nut 380 rotating in the opposite direction the yoke 376 remains stationary to avoid change in adjustment of the louvers 375 during the rotation of the motion picture camera turret 22.

If the image produced by the electronic viewer V is unduly dim the operator will be warned that the aperture of the motion picture camera lens is unduly restricted and, on the other hand, undue brightness of the electronic image will indicate that the diaphragm of the motion picture camera lens is open too wide for optimum exposure of the film. Thus the brightness of the electronic image serves as a check on the automatic operation of the aperture-control system.

Figure 16:
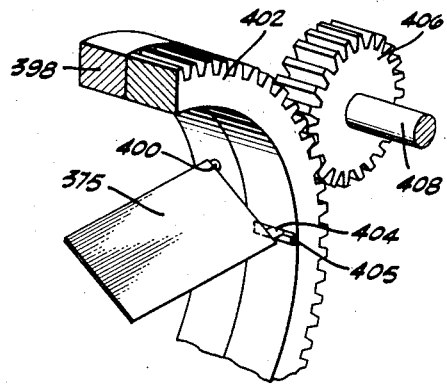
Fig. 16 is a fragmentary perspective view showing how the light varying means in the form of louvers in Fig. 14 may be controlled mechanically.

Fig. 16 shows by way of example how such a set of louvers 375 may be mounted in the electronic camera to provide the desired light valve action. The series of louvers 375 are mounted on a fixed ring 398, each of the louvers having a pair of trunnions 400 journalled in corresponding bores on the inner circumference of the fixed ring. Each of the louvers 375 extends into the interior of a ring gear 402 that is mounted adjacent the fixed ring 398 coaxially thereof. Each of the louvers 375 has a control pin 404 at one end which extends into a corresponding slot 405 in the ring gear 402. Thus rotation of the ring gear 402 causes simultaneous pivotal movement of all of the louvers 375. A pinion 406 meshes with the ring gear 402, the pinion being carried by a shaft 408 that is operatively connected with the yoke 376 in a suitable manner to cause rotation of the shaft in response to travel of the yoke.

Figure 17:
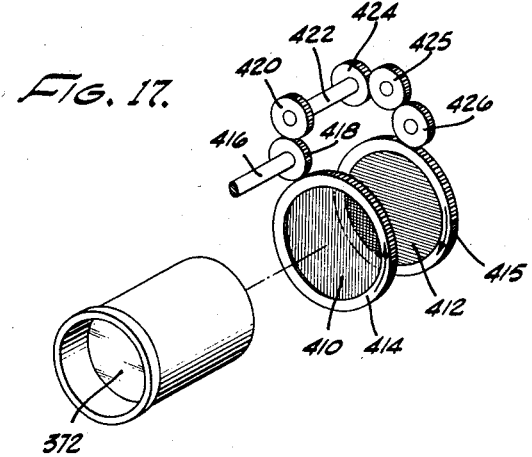
Fig. 17 is a diagrammatic perspective view showing how a pair of cooperating polarizing light filters may be used to vary the amount of image-forming light in the electronic camera.

Instead of employing a set of louvers 375 to serve as a light valve, a suitable pair of polarizing light filters 410 and 412 may be employed for the same purpose, as shown in Fig. 17. The two filters 410 and 412 are mounted coaxially to intercept the light from the lens 372 of the electronic camera and serve to vary the amount of transmitted light when rotated relative to each other in a well known manner. The filter 410 is mounted in a ring gear 414 and the filter 412 is mounted in a second ring gear 415 with suitable provision for causing relative rotation between the two ring gears.

In the arrangement shown in Fig. 17, a control shaft 416 carries a pinion 418 that meshes both with the ring gear 414 and with a second pinion 420 on a short shaft 422. The shaft 422 carries a third pinion 424 which is operatively connected with the ring gear 415 by means of a train of two pinions 425 and 426. Thus rotation of the shaft 416 causes rotation in opposite directions of the two filters 410 and 412 to vary the amount of light that is transmitted from the lens 372 to the electronic image tube 374. The control shaft 416 is operated by suitable means in response to shift of the yoke 376 along the screw 378.

With either of these two arrangements shown in Figs. 16 and 17 for varying the amount of image-forming light in the electronic camera, the electronic image may be dimmed or brightened without affecting the depth of field of the lens 372. With the fixed aperture of the electronic camera lens 372 of larger relative size, i. e., adjusted at a lower $f$ value, than the aperture adjustment of the motion picture camera lens and/or with the electronic camera lens of longer focal length than the motion picture camera lens, the depth of field of the electronic camera lens will be much shorter than the depth of field of the motion picture camera lens. By virtue of this arrangement, the operator may be sure that the motion picture camera is correctly focused if the electronic image is sharp. Thus the sharpness of definition of the electronic image provides a reliable check on the focus adjustment of the motion picture camera and of course is a check also on the focus adjustment of the electronic camera too. This arrangement also insures automatically that the electronic camera will be adjusted to maintain a good electronic image regardless of how widely light conditions fluctuate.

Figure 18:
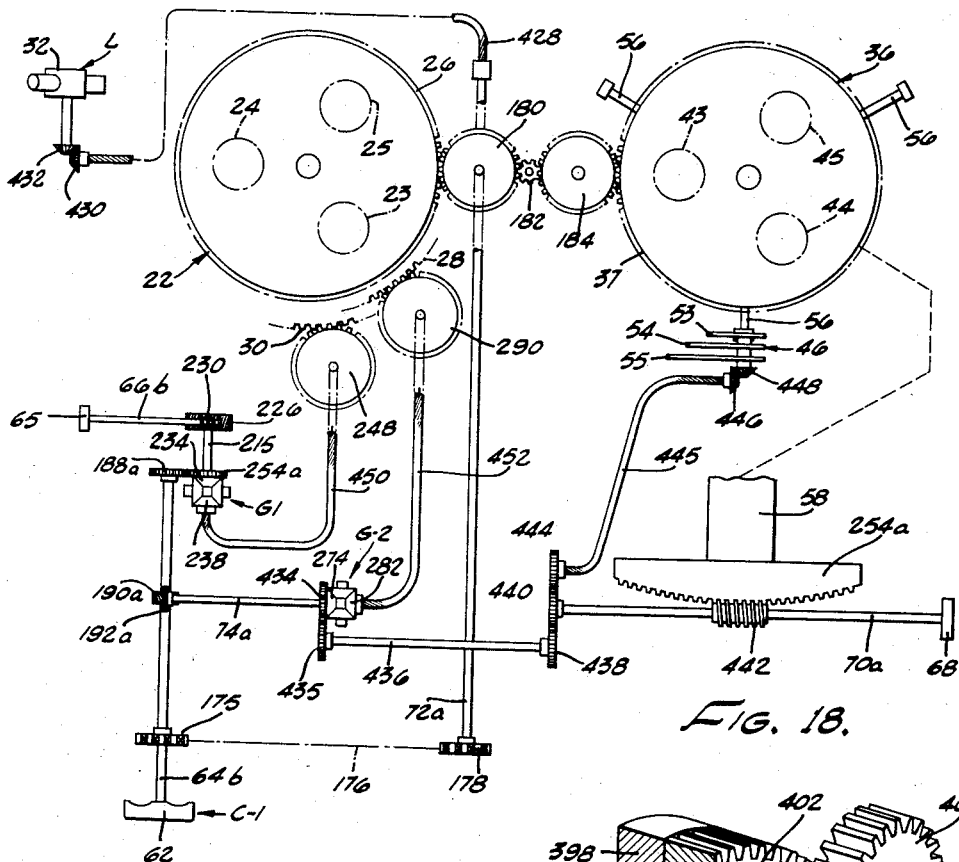
Fig. 18 is a diagrammatic view showing how flexible shafts may be used in the control system instead of cables.

*The modification shown in Fig. 18*

Fig. 18 shows how flexible shafts may be substituted for the cables used in the described control system.

The turret-control handle 62 is mounted on a turret-control shaft 64b and is operatively connected to a countershaft 72a in the maner heretofore described by a sprocket 175 connected to a second sprocket 178 by a sprocket chain 176. The countershaft 72a carries the usual gear 180 that meshes with the ring gear 26 to rotate the motion picture camera turret 22. The gear 180 also meshes with the pinion 182 to rotate the gear 184 for simultaneous rotation of the ring gear 37 that operates the turret 36 of the electronic camera. A flexible shaft 428 operatively connects the countershaft 72a with a bevel gear 430 that meshes with a second bevel gear 432 for rotation of the light meter turret 32.

The turret-control shaft 64b carries a gear 188a which meshes with the gear 234a in the manner heretofore described for actuating the bevel gear 234 of the differential gear train G–1. Also as heretofore described, the focus-control knob 65 is mounted on a focus-control shaft 66b that carries the worm 230 in mesh with the worm gear 226. The worm gear 226 is on the hollow shaft 215 for actuation of the spider of the differential gear train G–1.

The turret-control shaft 64b also carries the usual worm gear 190a which cooperates with the second worm gear 192a to rotate the shaft 74a, this shaft being connected in the usual manner with the spider of the second differential gear train G–2. The shaft 74a also carries a gear 434 which meshes with a gear 435 on a shaft 436. The shaft 436 carries a gear 438 in mesh with a gear 440 on a control shaft 70a that carries the focus-control knob 68. The focus-control shaft 70a carries a worm 442 in mesh with a gear segment 254a that is fixedly mounted on the movable base 58 of the electronic camera, the gear segment 254a corresponding to the member 254 in Fig. 2.

The gear 440 on the focus-control shaft 70a also meshes with a gear 444 that is connected by a flexible shaft 445 with a bevel gear 446. The bevel gear 446 meshes with a second bevel gear 448 that is substituted for the previously described cable drum 174 and serves the same purpose of actuating the rotary cam assembly 46.

The differential gear train G–1 is operatively connected to the gear 248 that controls the aperture-adjustment ring gear 30 and for this purpose a flexible shaft 450 connects the bevel gear 238 of the differential gear train directly with the gear 248. In like manner the second differential gear train G–2 operates the gear 290 in mesh with the focus-adjustment ring gear 28, the bevel gear 282 of the differential gear train being connected directly to the gear 290 by a flexible shaft 452.

It can be seen that the control arrangement shown in Fig. 18 operates in essentially the same manner as the control arrangement shown in Fig. 3. When the focus-control knob 65 on the shaft 66b is rotated to actuate the spider of the differential gear train G–1, the flexible shaft 450 is actuated to actuate the aperture-adjustment ring gear 30 independently of the motion picture camera turret 22. When the turret-control 62 on the turret-control shaft 64b is rotated to cause the countershaft 72a to actuate the ring gear 26 for rotation of the motion picture camera turret 22, the gear 18a on the control shaft 64b operates the differential gear train G–1 for simultaneous and synchronous rotation of the aperture-adjustment ring gear 30.

Rotation of the focus-control knob 68 causes the worm 442 to swing the electronic camera laterally for adjustment in compensation for parallax and simultaneously the flexible shaft 445 is rotated for focus adjustment of the electronic camera and shaft 436 is actuated to cause the differential gear train G–2 to actuate the focus-adjustment ring gear 28 to change the focus of the motion picture camera. When the turret-control handle 62 is actuated, the differential gear train G–2 is simultaneously actuated by the shaft 74a to cause the focus-adjusting ring gear 28 to be rotated synchronously with the motion picture camera turret 22 to avoid disturbing the focus adjustment of the motion picture camera lenses.

The description herein in specific detail of selected practices of the invention will suggest various changes, substitutions and other departures from the disclosure that properly lie within the spirit and scope of the appended claims.

We claim:

1. In an apparatus of the character described, the combination of: a camera; a turret on the camera carrying a plurality of lenses having adjustable apertures; rotary means mounted concentrically on said turret for aperture adjustment of all of said lenses; a differential gear train operatively connected to said rotary means; a turret-control operatively connected both with said turret and said gear train to actuate the turret and said rotary means synchronously for change in rotational position of the turret without change in aperture adjustment of the lenses; and aperture-control means operatively connected to said gear train to actuate said rotary means independently of the turret.

2. In an apparatus of the character described, the combination of: a camera; a turret on said camera carrying a plurality of lenses having focal adjustments; rotary means mounted concentrically on said turret for focus adjustment of all of said lenses; a differential gear train operatively connected to said rotary means; a turret-control operatively connected to both said turret and said gear train to actuate the turret and said rotary means synchronously for change in rotary position of the turret without change in the focus adjustment of said lenses; and focus-control means operatively connected to said gear train to operate said rotary means independently of the turret for change in focus of said lenses.

3. In an apparatus of the character described, the combination of: a camera; a turret on the camera carrying a plurality of lenses, said lenses having aperture adjustments and focus adjustments; a first rotary means mounted concentrically on said turret to adjust the apertures of said lenses; a second rotary means mounted concentrically on said turret to adjust the focus of said lenses; a first differential gear train operatively connected to said first rotary means; a second differential gear train operatively connected to said second rotary means; a turret-control operatively connected with said turret and with both of said gear trains to actuate the turret and said two rotary means synchronously for change in rotational position of the turret without change in either aperture adjustment or focus adjustment of said lenses; aperture-control means operatively connected with said first gear train for actuation of said first rotary means independently of the turret; and focus-control means operatively connected with said second gear train for actuation of said second rotary means independently of the turret.

4. In an apparatus of the character described, the combination of: a motion picture camera; an electronic camera adjacent the motion picture camera to create an image of substantially the same subject as the camera; means to adjust the angle of the two cameras relative to each other to compensate for parallax; a turret on said motion picture camera carrying a plurality of lenses having focal adjustments; rotary means on said turret for adjusting the focus of all of said lenses; a differential gear train operatively connected to said rotary means for focus adjustment of said lenses and operatively connected with said parallax-compensating means for simultaneous actuation therewith; a turret-control operatively connected both with said turret and with said gear train for actuation of the turret and said rotary means synchronously for change in rotational position of the turret without change in focus adjustment of said lenses; and focus-control means operatively connected with said parallax-compensating means for adjustment thereof and for simultaneous actuation of said rotary means through said gear train for focus adjustment of said lenses.

5. In an apparatus of the character described, the combination of: a motion picture camera; an electronic camera adjacent the motion picture camera to create an image of substantially the same subject as the camera; means to adjust the angle of the two cameras relative to each other to compensate for parallax; a turret on said motion picture camera carrying a plurality of lenses having focal adjustments; rotary means on said turret for adjusting the focus of all of said lenses; a differential gear train operatively connected with said rotary means; a turret-control operatively connected both with said turret and with said gear train for actuation of the turret and said rotary means in synchronism to change the rotational position of said turret without change in focus of said lenses; and focus-adjustment means operatively connected both with said gear train and said parallax-compensating means for simultaneous actuation of the parallax-compensating means and said rotary means.

6. In an apparatus of the character described, the combination of: a camera, a turret on said camera carrying a plurality of lenses having adjustable apertures; rotary means mounted on said turret concentrically thereof for adjusting the apertures of all of said lenses; a light meter to measure the lighting of the subject imaged in the camera; means for varying the light effectively admitted to said meter in accord with the lens positioned for use by said turret; differential gearing operatively connected with said rotary means; a turret-control operatively connected with said turret, with said light-varying means of the light meter, and with said gear train for synchronous actuation of said turret, said light-varying means and said rotary means; and aperture-control means operatively connected with said gear train for actuation of said rotary means independently of the turret.

7. A combination as set forth in claim 6 in which said aperture-control means is responsive to said light meter for automatic aperture adjustment of said lenses.

8. In an apparatus of the character described, the combination of: a camera; a turret on said camera carrying a plurality of lenses having aperture and focus adjustments; a first means on said turret concentrically rotatable relative thereto for aperture adjustment of all said lenses simultaneously; a second means mounted on said turret for concentric rotation relative thereto for focus adjustment of all of said lenses; an aperture-control operatively connected with said first concentric means; a focus adjustment operatively connected with said second concentric means; and a turret-control operatively connected with said turret and with both said concentric means for rotation of the two concentric means synchronously with rotation of the turret.

9. A combination as set forth in claim 8 which includes a differential gear train operatively connecting said aperture-control with said first concentric means for actuation thereof independently of the turret and operatively connecting said turret control with said first concentric means for rotation of the first concentric means synchronously with the turret.

10. In an apparatus of the character described, the combination of: a motion picture camera; a turret on said camera carrying a plurality of adjustable-focus lenses; a means on said turret movable relative thereto and continuously operatively connected with all of said lenses; to control the focus adjustment of all of said lenses simultaneously; an electronic camera adjacent said motion picture camera; means to vary the angle between said two cameras to compensate for parallax; control means remote from said turret and operatively connected both with said relatively movable means and with said parallax-compensating means to vary the focus adjustment of said lenses and simultaneously vary the parallax adjustment of the two cameras; and control means remote from said turret operatively connected both with the turret and said relatively movable means for rotation of the turret without change in focus adjustment of said lenses.

11. In an apparatus of the character described, the combination of: a motion picture camera; a turret on said camera carrying a plurality of lenses having aperture adjustments; means mounted on said turret and movable relative thereto for aperture adjustment of said lenses; a light meter to measure the illumination of the subject to be photographed by said camera; means for varying the light effectively admitted to said light meter in accord with said lenses; control means remote from said turret operatively connected with said relatively movable means for changing the aperture adjustments of said lenses; and control means remote from said turret operatively connected with said light-varying means, with said turret and with said relatively movable means for synchronous operation thereof.

12. In an apparatus of the character described, the combination of: a motion picture camera; a turret on said camera having a plurality of lenses with focus adjustments; an electronic camera adjacent said motion picture camera to create images of substantially the same subject as the motion picture camera; means to vary the angle between said two cameras to compensate for parallax; a turret on said electronic camera carrying a plurality of lenses corresponding to the motion picture camera lenses, said electronic camera lenses having focus adjustments; a first control means remote from both said turrets for rotating both of the turrets synchronously; and a second control means remote from both said turrets for focus adjustment of all the lenses on both cameras, said second control means being operatively connected with said parallax-compensating means for actuation thereof in synchronism with changes in focus adjustment of the lenses of the two cameras.

13. In an apparatus of the character described, the combination of: a motion picture camera; a turret on said camera carrying a plurality of lenses for selective positioning at an effective station, said lenses having aperture and focus adjustments; an electronic camera adjacent said motion picture camera to create images of the same subject as the motion picture camera; a turret on said electronic camera having a plurality of lenses corresponding to the lenses of the motion picture camera, said lenses on the electronic camera being adjustable in focus; means to vary the angle between the two cameras in compensation for parallax adjustment; a first control means remote from both said turrets for rotating the two turrets synchronously; a second control means operatively connected to said parallax-compensating means and remote from both the turrets for adjusting the focus of all of said lenses synchronously; and a third control means remote from both said turrets for adjusting the apertures of all the motion picture lenses synchronously.

14. In an apparatus of the character described, the combination of: a motion picture camera; a turret on said camera carrying a plurality of lenses having aperture adjustments; means mounted on said turret for movement relative thereto to vary the aperture adjustment of all said lenses; a first remote control means for actuating said relatively movable means; an electronic camera adjacent said motion picture camera to create images of the same subject as the motion picture camera; means to vary the angle between the two cameras to compensate for parallax; a turret on said electronic camera carrying a plurality of lenses corresponding with the lenses on the motion picture camera; and a second control means operatively connected with said parallax-compensating means and remote from both said turrets for actuating both said turrets and said relatively movable means synchronously.

15. In an apparatus of the character described, the combination of: a motion picture camera; a turret on said camera carrying a plurality of lenses for selective use, said lenses having aperture adjustments; an electronic camera adjacent said motion picture camera to create images of the same subject as the motion picture camera; an electronic viewer to reproduce the image produced by said electronic camera; a turret on said electronic camera carrying a plurality of lenses for selective use corresponding to the motion picture camera lenses; a light meter to measure the illumination of the subject to be photographed by the motion picture camera; means responsive to rotation of said turret to vary the light effectively admitted to said light meter in accord with the selected lenses of the motion picture camera; means remote from both said turrets and operatively connected with both of the turrets and with said light-varying means for synchronous actuation of the two turrets and the light-varying means; and means remote from both said turrets for synchronous aperture adjustment of all of the lenses on the motion picture camera.

16. In an apparatus of the character described, the combination of: a motion picture camera; a turret on said camera carrying a plurality of lenses having focus adjustments; means mounted on said turret and movable relative thereto for adjusting the focus of all of said lenses; an electronic camera adjacent said motion picture camera to create images of the same subject as the motion picture camera; a turret on said electronic camera carrying a plurality of lenses corresponding to the lenses of the motion picture camera, said lenses on the electronic camera having focus adjustments; a corresponding plurality of individual control means mounted on said electronic camera turret and movable relative thereto for individually controlling the focus of the electronic camera lenses respectively; a focus control for the electronic camera positioned adjacent the electronic camera turret to cooperate with each of said control means when the corresponding electronic lens is positioned for use by the electronic camera turret; and a first remote control means operatively connected with said relatively movable means on the motion picture camera turret and operatively connected with said focus-control for synchronous focus adjustment of the two cameras.

17. A combination as set forth in claim 16 in which each of said individual control means on said electronic camera turret are mounted at different positions thereon to move in a corresponding plurality of paths when the electronic camera turret is rotated; and in which said focus control includes a corresponding plurality of adjustable cams interconnecting said paths respectively for operative cooperation with said individual control means.

18. In an apparatus of the character described, the combination of: a motion picture camera; an electronic camera adjacent the motion picture camera to create images of substantially the same subject as the motion picture camera; a first turret on said motion picture camera carrying a plurality of lenses having focus adjustments; a second turret on said electronic camera carrying a plurality of lenses with focus adjustments; a first rotary means on said first turret for concentric rotation relative thereto to adjust all of the lenses thereon to the same focal distance; a second means to adjust all of the lenses of the electronic camera to the same focal distance; a differential gear train operatively connected to said first means to adjust the focus of the lenses on the motion picture camera; a turret-control operatively connected with both said turrets for synchronous rotation thereof and operatively connected to said differential gearing for synchronous rotation of said first means to prevent relative rotation between said first means and said first turret when the first turret is rotated; and a focus-control operatively connected both to said gear train and to said second means for synchronous focus adjustment of all the lenses of both cameras.

19. A combination as set forth in claim 18 which includes means to adjust the angle of said cameras relative to each other in compensation for parallax; and in which said parallax-compensating means is operatively connected with said focus-control for actuation thereby.

20. A combination as set forth in claim 19 in which said focus control is operatively connected to one of said cameras to move said camera relative to the other camera; and in which said one camera is operatively connected to said gear train whereby the movements of said one camera in compensation for parallax actuate said gear train to change the focus adjustment of the lenses on the motion picture camera.

21. In an apparatus of the character described, the combination of: a camera; a turret on said camera having a plurality of adjustable lenses for selective movement thereby to a position for use on the camera; a plurality of individual adjustment means on said turret operatively connected to said lenses respectively for individual adjustments thereof, said plurality of adjustment means having corresponding actuating members positioned on said turret for movement in a corresponding plurality of different paths when the turret rotates; a focus-control adjacent said turret having a number of positions, each of which represents the same adjustment for all of said lenses, said focus-control having a plurality of portions corresponding respectively with said individual adjustment means, said focus-control having portions extending respectively into said paths for operative engagement with the corresponding actuating means when the corresponding lenses on the cameras are at said position for use.

22. In an apparatus of the character described, the combination of: a motion picture camera having at least one lens, said lens having a focus adjustment; an electronic camera adjacent said motion picture camera to create an image of substantially the same subject as the motion picture camera, said electronic camera having at least one lens with a focus adjustment; an electronic viewer to reproduce the image produced by said electronic camera; and means to vary the focus adjustment of the motion picture camera lens and the electronic camera lens synchronously, the $f$ stop adjustment of said electronic camera lens being lower than the $f$ stop adjustment of said motion picture camera lens to shorten the depth of field of the electronic camera lens relative to the depth of field of the motion picture camera lens whereby a sharp image on said viewer insures a sharp image in said motion picture camera.

23. In an apparatus of the character described, the combination of: a motion picture camera having at least one lens, said lens having an aperture adjustment and a focus adjustment; an electronic camera adjacent said motion picture camera to create an image of substantially the same subject as the motion picture camera, said electronic camera having at least one lens with a focus adjustment; an electronic viewer to reproduce the image produced by said electronic camera; and a single control means to vary the focus adjustment of the motion picture camera lens and the electronic camera lens synchronously, the focal length of said electronic camera lens being longer than the focal length of the corresponding motion picture camera lens to shorten the depth of field of the electronic camera lens relative to the depth of field of the motion picture camera lens whereby a sharp image on said viewer insures a sharp image in said motion picture camera; means to vary the amount of light in said electronic camera to maintain an adequate electronic image under different light conditions; and aperture control means operatively connected both with said motion picture camera lens and with said light-varying means whereby the brightness of the image on the electronic viewer provides a check on the setting of the aperture control means.

24. A combination as set forth in claim 23 which includes a light meter to sense the illumination of the subject and which includes means responsive to said light meter to control said aperture-control means.

25. A combination as set forth in claim 23 in which said means to vary the light in said electronic camera comprises a plurality of variable louvers.

26. A combination as set forth in claim 23 in which said means to vary the light in the electronic camera comprises a pair of relatively rotatable light-polarizing elements.

27. In an apparatus of the character described, the combination of: a camera; a turret on said camera carrying a plurality of lenses having adjustable apertures; rotary means mounted concentrically on said turret to control the aperture adjustments of said lenses; a light meter to sense the illumination of the subject to be photographed; a turret on said light meter having a plurality of apertures corresponding with said plurality of lenses; a differential gear train operatively connected with said concentric means; a turret control operatively connected with both said turrets for synchronous operation thereof and operatively connected with said gear train for rotation of said concentric means synchronously with said turret; and means responsive to said light meter and operatively connected to said gear train for actuation of said concentric means independently of the camera turret.

28. In an apparatus of the character described, the combination of: a camera having a plurality of lenses; a lens-shifting mechanism on the camera for selectively placing said lenses in position for use; a mechanism for adjusting the aperture of the selected lens that is in position for use; a light meter to measure the illumination of the subject to be photographed; means synchronized with said lens-shifting mechanism for varying the light effectively admitted to said light meter in accord with the selected camera lens; and servo means responsive to said light meter for automatic actuation of said aperture-adjustment mechanism.

29. A combination as set forth in claim 28 in which said servo mechanism is provided with means including a scale of film speeds for adjusting the servo mechanism in accord with the speed of the film in the camera.

30. In an apparatus of the character described, the combination of: a camera; a turret on said camera having a plurality of lenses for selective use; rotary means on said turret for controlling the aperture adjustment of said lenses; a light meter to measure the illumination of the subject to be photographed; means to vary the light effectively admitted to said light meter in accord with the selected camera lens; a differential gear train operatively connected to said rotary means; a turret control operatively connected to said turret and to said light varying means for synchronous operation thereof, said turret control being operatively connected with said gear train for operating said rotary means in synchronism with the turret; and a servo mechanism responsive to said meter and operatively connected with said gear train for automatic control of said rotary means independently of the turret.

31. In an apparatus of the character described, the combination of: a film camera; a turret on said camera having a plurality of lenses for selective use; rotary means on said turret for controlling the aperture adjustment of said lenses; a light meter to measure the illumination of the subject to be photographed; means to vary the light effectively admitted to said light meter in accord with the selected camera lens; an electronic camera adjacent said film camera to form an image of substantially the same subject as the film camera; means to vary the amount of light in said electronic camera without changing the aperture adjustment of the electronic camera lens; an electronic viewer to reproduce the image produced in said electronic camera; a differential gear train operatively connected both with said rotary means and with said light-varying means of the electronic camera for synchronous operation thereof; a turret control operatively connected to said turret and to said light-varying means of the light meter for synchronous operation thereof, said turret control being operatively connected with said gear train for operation of said rotary means in synchronism with the turret; means to actuate said gear train for aperture adjustment of the film camera; and means responsive to said turret control to prevent response of said light-varying means of the electronic camera to operation of said gear train when said turret control actuates the gear train.

32. A combination as set forth in claim 31 in which said electronic camera has a plurality of lenses for selective use corresponding to said plurality of lenses on the motion picture camera; and in which the focal length of each of the electronic camera lenses is longer than the focal length of the corresponding motion picture camera lens whereby the depth of field of the selected electronic camera lens is shorter than the depth of field of the corresponding selected motion picture camera and therefore sharpness of definition of the electronic image is insurance that the motion picture camera is correctly focused.

33. In an apparatus of the character described, the combination of: a film camera; a turret on said camera having a plurality of lenses for selective use; rotary means on said turret for controlling the aperture adjustment of said lenses; a light meter to measure the illumination of the subject to be photographed; means to vary the light effectively admitted to said light meter in accord with the selected camera lens; an electronic camera adjacent said film camera to form an image of substantially the same subject as the film camera; means to vary the amount of image-forming light admitted to said electronic camera without changing the aperture adjustment of the electronic camera lens; an electronic viewer to reproduce the image produced in said electronic camera; a differential gear train operatively connected both with said rotary means and with said light-varying means of the electronic camera for synchronous operation thereof whereby the brightness of the image produced by said electronic viewer varies with the aperture adjustment of the lenses on said film camera; a turret control operatively connected to said turret and to said light-varying means of the light meter for synchronous operation thereof, said turret control being operatively connected with said gear train for operation of said rotary means in synchronism with the turret; a servo mechanism responsive to said light meter and operatively connected with said gear train for automatic control of said rotary means and said light-varying means of the electronic camera independently of said turret; and means responsive to said turret control to prevent response of said light-varying means of said electronic camera to operation of said gear train when said turret control actuates the gear train.

34. In an apparatus of the character described, the combination of: a motion picture camera having at least one lens, said lens having a focus adjustment; an electronic camera adjacent said motion picture camera to create an image of substantially the same subject as the motion picture camera, said electronic camera having at least one lens with a focus adjustment; an electronic viewer to reproduce the image produced by said electronic camera; and means to vary the focus adjustment of the motion picture camera lens and the electronic camera lens synchronously, said electronic camera lens having a longer focal length than the corresponding motion picture camera lens to shorten the depth of field of the electronic camera lens reative to the depth of field of the motion picture camera lens whereby a sharp image on said viewer insures a sharp image on said motion picture camera.

References Cited in the file of this patent

UNITED STATES PATENTS

| | | |
|---|---|---|
| 2,297,262 | Tonnies | Sept. 29, 1942 |
| 2,358,084 | Mihalyi | Sept. 12, 1944 |
| 2,420,197 | Rosenthal | May 6, 1947 |
| 2,640,777 | Fachman | June 2, 1953 |
| 2,655,086 | Walker | Oct. 13, 1953 |
| 2,672,798 | Snyder | Mar. 23, 1954 |

FOREIGN PATENTS

| | | |
|---|---|---|
| 531,524 | France | Oct. 26, 1921 |
| 378,749 | Germany | July 31, 1923 |
| 703,215 | Germany | Mar. 4, 1941 |